United States Patent [19]

Nagy

[11] Patent Number: 4,679,455
[45] Date of Patent: Jul. 14, 1987

[54] MULTIRATIO POWER TRANSMISSION

[75] Inventor: Laszlo Nagy, Rochester, Mich.

[73] Assignee: General Motors Corporation, Detroit, Mich.

[21] Appl. No.: 747,793

[22] Filed: Jun. 24, 1985

[51] Int. Cl.[4] .............................................. F16H 3/08
[52] U.S. Cl. ........................................ 74/359; 74/325
[58] Field of Search ................. 74/359, 360, 701, 325, 74/331, 330, 700, 322, 323, 324, 356

[56] References Cited

U.S. PATENT DOCUMENTS

| 905,519 | 12/1908 | Hanson | 74/359 |
|---|---|---|---|
| 1,101,597 | 6/1914 | Weigel | 74/359 |
| 1,827,582 | 10/1931 | Jacobs | 74/359 |
| 2,042,235 | 5/1936 | Misiak, Jr. | 74/359 |
| 2,947,190 | 8/1960 | Johnson | 74/331 |
| 3,498,150 | 3/1970 | Funk | 74/359 |
| 4,033,200 | 7/1977 | Stockton | 74/325 |
| 4,106,358 | 8/1978 | Morrison | 74/359 |
| 4,269,077 | 5/1981 | Vandervoort | 74/359 |
| 4,470,326 | 9/1984 | Schmidt | 74/701 |
| 4,549,443 | 10/1985 | White | 74/360 |
| 4,580,459 | 4/1986 | Zenker et al. | 74/359 |

FOREIGN PATENT DOCUMENTS 0094657  6/1983  Japan ..................... 74/359

Primary Examiner—Allan D. Herrmann
Assistant Examiner—David Novais
Attorney, Agent, or Firm—Donald F. Scherer

[57] ABSTRACT

A step ratio power transmission provides a plurality of drive ratios between the input and output shafts. The power transmission, in addition to the input and output shafts, has a countershaft on which a plurality of ratio gears are rotatably mounted. The input shaft has at least one ratio gear rotatably mounted thereon while the output shaft has at least one gear secured thereto. A cluster gear is secured to either the input shaft or the output shaft while the other of these shafts has roatably mounted thereon one or more ratio gears. At least one of the ratio gears on the input shaft serves as an idler gear for one or more of the ratio gears on the countershaft.

2 Claims, 3 Drawing Figures

MULTIRATIO POWER TRANSMISSION

BACKGROUND OF THE INVENTION

This invention relates to power transmissions and more particularly to countershaft type power transmissions having a plurality of step ratios.

SUMMARY OF THE INVENTION

With an increase in the number of transverse front wheel drive vehicles having a reduced dimension between the front wheels, it is necessary to maintain or reduce the axial length of the transmission mechanism. It is also desirable to increase the number of speed ratios which are available during operation of the transmission.

The present invention provides for a gearing arrangement within a countershaft type transmission wherein the same axial length of prior art transmissions is maintained or slightly decreased while an increase in the number of forward speed ratios from four to five is obtained.

It is therefore an object of this invention to provide an improved step ratio power transmission having an input shaft, an output shaft and a countershaft with intermeshing gears disposed coaxially with the respective shaft members and wherein at least one ratio gear rotatably disposed on the input shaft acts as an idler gear between a ratio gear on the countershaft and an output gear secured for rotation with the output shaft.

It is another object of this invention to provide an improved step ratio power transmission having an input shaft, an output shaft and a countershaft with intermeshing gear members disposed coaxially with the shafts wherein a cluster gear is secured for rotation with either the input shaft or the output shaft, and ratio gears meshing with the cluster gear are rotatably mounted on the other of the input or output shaft, and also wherein at least one ratio gear is rotatably mounted on the input shaft to provide idler gear operation between a ratio gear on the countershaft and a gear member secured for rotation with the output shaft.

It is a further object of this invention to provide an improved step ratio countershaft type power transmission having an input shaft, an output shaft and a countershaft and wherein at least one gear member is secured for rotation with the output shaft, and intermeshing ratio gear members are rotatably mounted on the input shaft and the countershaft with the ratio gear member on the input shaft operating as an idler gear between the ratio gear member on the countershaft and the gear member secured to the output shaft and also wherein a pair of selectively engageable clutch members are operable to connect the ratio gears to their respective shaft members.

These and other objects and advantages of the present invention will be more apparent from the following specification and drawings.

DESCRIPTION OF THE EMBODIMENTS

Figure 1:
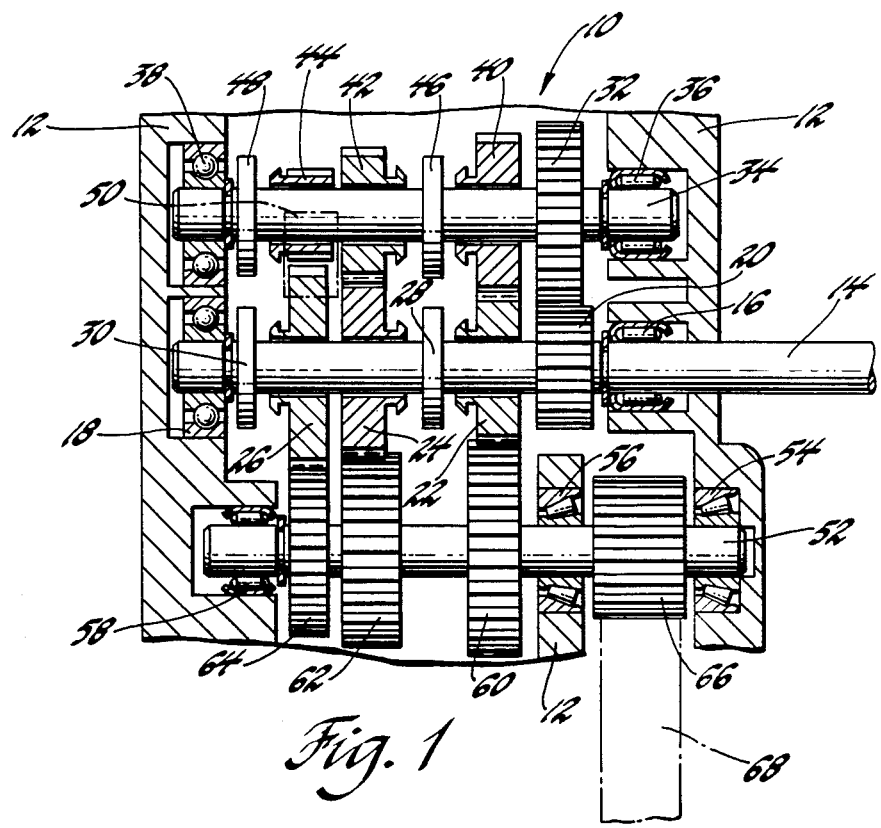
FIG. 1 is a diagrammatic representation of a countershaft type transmission incorporating the present invention.

Referring to the drawings, wherein like characters represent the same or corresponding parts throughout the several views, there is seen in FIG. 1 a power transmission, generally designated 10, having a transmission housing or case 12 in which is rotatably disposed an input shaft 14. The input shaft 14 is mounted on a needle or roller bearing 16 and a ball bearing 18. The input shaft 14 has a transfer or head gear 20 secured for rotation therewith, and a plurality of ratio gears 22, 24 and 26 rotatably mounted thereon. The ratio gears 22 and 24 can be selectively connected for rotation with the input shaft 14 by a conventional synchronizer clutch 28, while the ratio gear 26 is selectively connectible for rotation with the input shaft 14 by a synchronizer clutch 30. The synchronizer clutches 28 and 30 and other synchronizer clutches, which will be referred to during the subsequent description of the embodiments are conventional well-known mechanisms which are generally operated by shift lever and shifter fork mechanisms, also which are well-known. Those familiar with the operation of countershaft type transmissions are aware that manual shift controls including the shifter lever and forks, prevents the simultaneous engagement of more than one synchronizer clutch at any given time.

The transfer gear 20 meshes with a transfer or head gear 32 which is secured for rotation with a countershaft 34 which is rotatably supported in the transmission housing 12 on a roller bearing 36 and a ball bearing 38. Since the gears 20 and 32 are secured to their respective shaft members 14 and 34, the countershaft 34 will rotate whenever the input shaft 14 is rotated.

The countershaft 34 has rotatably disposed thereon a plurality of ratio gears 40, 42 and 44. The ratio gears 40 and 42 are selectively connectible for rotation with the countershaft 34 through a synchronizer clutch assembly 46, while ratio gear 44 is selectively connectible with the countershaft 34 through a synchronizer clutch assembly 48. The ratio gear 40 is in continuous mesh with the ratio gear 22 and the ratio gear 42 is in continuous mesh with the ratio gear 24. The ratio gear 44 meshes with a reverse idler gear 50, shown in phantom, which in turn meshes with ratio gear 26.

An output shaft 52 is rotatably supported in the housing 12 by a pair of tapered roller bearings 54 and 56 and a needle roller bearing 58. The output shaft 52 has fixed thereon gear members 60, 62 and 64. This gear arrangement 60, 62 and 64 is quite often referred to as a cluster gear since, in general practice, the three gears are made integral and then the cluster is assembled for rotation with the shaft member.

The gear 60 meshes with the ratio gear 22, the gear 62 meshes with the ratio gear 24 and the gear 64 meshes with the ratio gear 26. The output shaft 52 also has secured thereto an output gear member 66 which meshes with a ring gear 68, shown in phantom, which is a component of a conventional differential gear set, not shown.

By judicious selection and engagement of the synchronizer clutch mechanisms 28, 30, 46 and 48, the transmission 10 can be operated to provide five forward speed ratios and one reverse speed ratio. The first and lowest speed ratio is provided when synchronizer mechanism 46 engages ratio gear 40. When this occurs, power flows from the input shaft 14 through the transfer gears 20 and 32 to the countershaft 34 and therefore ratio gear 40. Ratio gear 40 rotates ratio gear 22, which acts as an idler, which in turn rotates gear 60 and therefore output shaft 52.

Second gear or speed ratio is established by engaging synchronizer clutch 46 with ratio gear 42. The rotation of input shaft 14 is transmitted through transfer gears 20 and 32 to ratio gear 42 which in turn rotates ratio gear 24. Ratio gear 24, acting as an idler, rotates gear 62 which in turn rotates output shaft 52.

The third gear or speed ratio is established by the selective engagement of synchronizer clutch 28 with ratio gear 22. During third gear operation, input shaft 14 rotates ratio gear 22 through synchronizer clutch 28. Ratio gear 22 rotates gear 60 which in turn rotates the output shaft 52.

Fourth gear or speed ratio is established by selective engagement of synchronizer clutch 28 with ratio gear 24 such that rotation of the input shaft 14 is transmitted to the output shaft 52 through gears 24 and 62.

The fifth gear or speed ratio is established by selective engagement of synchronizer clutch 30 with the ratio gear 26. In fifth gear operation, the rotation of input shaft 14 is transmitted to the output shaft 52 through the operation of gears 26 and 64.

The reverse gear ratio is established by selective engagement of the synchronizer clutch 48 with the ratio gear 44. During reverse operation, rotation of the input shaft 14 is reversed and transmitted to the output shaft 52 through the action of ratio gear 44, reverse idler gear 50, ratio gear 26 and gear member 64. During reverse drive ratio there are two idler gears provided; namely, 50 and 26.

During first and second gear operation, the ratio gears 22 and 24 respectively provide idler gear operation. Without the use of the ratio gears 22, 24 and 26 as idler gear members, the length of the transmission 10 would have to be increased to accommodate an increased number of ratio gears on the input shaft 14 and a corresponding increase in the length of the cluster gear disposed on the output shaft 52.

Figure 2:
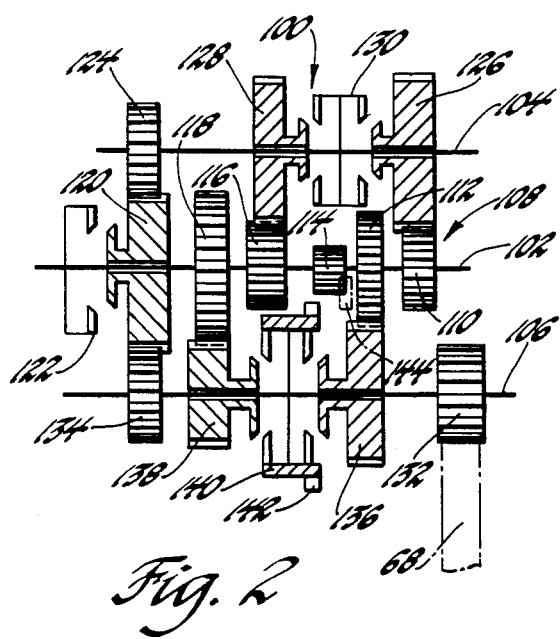
FIG. 2 is a diagrammatic representation of another embodiment of the invention.

There is seen in FIG. 2 a power transmission 100 which has an input shaft 102, a countershaft 104 and an output shaft 106. The input shaft 102 has rotatably secured thereto a cluster gear, generally designated 108, and comprised of gear members 110, 112, 114, 116 and 118. If desired, one or more of these gears 110-118 can be individually secured to the input shaft 102. There is also rotatably mounted on the input shaft 102 a ratio gear 120 which is selectively connectible therewith through a synchronizer clutch 122. The countershaft 104 has rotatably secured thereto a transfer gear member 124 which meshes with the ratio gear 120. Rotatably mounted on the countershaft 104 is a pair of ratio gears 126 and 128 which mesh with gears 110 and 116, respectively. The ratio gears 126 and 128 are selectively connectible for rotation with the countershaft 104 by a synchronizer clutch assembly 130. The output shaft 106 has rotatably secured thereto an output gear 132 and a transfer gear 134. Rotatably mounted on the output shaft 106 is a pair of ratio gears 136 and 138 which mesh with gears 112 and 118, respectively. The gears 136 and 138 are selectively connectible with the output shaft 106 by a synchronizer clutch assembly 140. The synchronizer clutch assembly 140 has formed integrally therewith a gear member 142 which is adapted to mesh with a reverse idler gear 144, shown in phantom, which meshes with gear 114. When a reverse drive ratio in transmission 100 is desired, gear 144 is shifted into mesh with gear 142 so that rotation of input shaft 102 is transmitted through gears 114, 144 and 142 to the output shaft 106.

The gearing arrangement of transmission 100 provides the first or lowest gear ratio through the engagement of synchronizer clutch 130 with gear ratio 126. During first gear operation, the input shaft 102 rotation is transmitted through gear 110, ratio gear 126, countershaft 104, transfer gear 124, ratio gear 120 and transfer gear 134 to the output shaft 106.

The second gear ratio is provided in transmission 100 by engagement of synchronizer clutch 130 with ratio gear 128. During second gear, the rotation of input shaft 102 is transmitted to the output shaft 106 through gear 116, ratio gear 128, countershaft 104, transfer gear 124, ratio gear 120 and transfer gear 134.

During both first and second ratios, the ratio gear 120, rotatably disposed on the input shaft 102, operates as an idler gear between the countershaft 104 and the output shaft 106. The third and fourth gear ratios are established through the engagement of synchronizer clutch 140 with ratio gears 136 and 138, respectively. The fifth and highest gear ratio of the transmission is established by the engagement of the synchronizer clutch 122 with the ratio gear 120. The paths of the ratios three through five are conventional and should be apparent without a detailed description.

Figure 3:
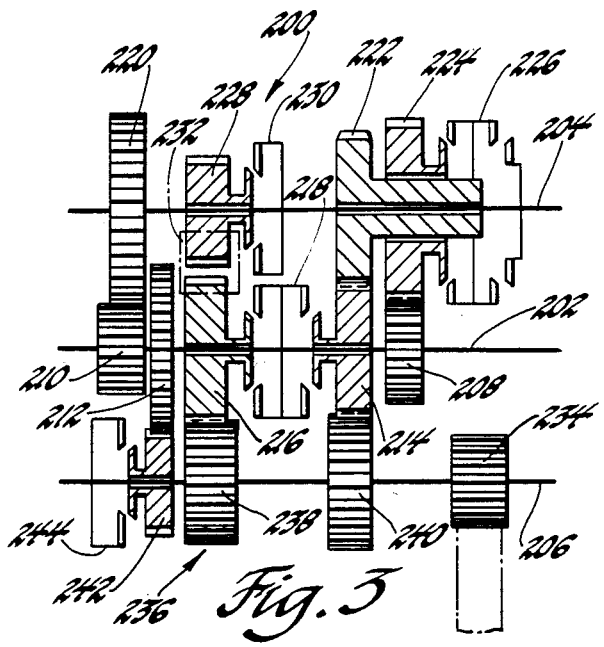
FIG. 3 is a diagrammatic representation of a further embodiment of the invention.

In FIG. 3, there is seen a power transmission, generally designated 200, having an input shaft 202, a countershaft 204 and an output shaft 206. The input shaft 202 has rotatably secured therewith three transfer gears 208, 210 and 212. Also, rotatably mounted on the input shaft 202 is a pair of ratio gears 214 and 216. The ratio gears 214 and 216 can be selectively connected with the input shaft 202 by a synchronizer clutch assembly 218.

The countershaft 204 has secured thereto a transfer gear 220 which meshes with the transfer gear 210. Rotatably disposed on the countershaft 204 are a pair of ratio gear members 222 and 224. Gear 222 is selectively connectible with the countershaft 204 by a synchronizer clutch assembly 226 while gear 224 is selectively connectible with gear 222 through the assembly 226. The ratio gears 222 and 224 mesh with ratio gear 214 and transfer gear 208, respectively. Also rotatably disposed on the countershaft 204 is a ratio gear 228 which is selectively connectible with the countershaft 204 by a synchronizer 230. The ratio gear 228 is in mesh with a reverse idler gear, shown in phantom at 232, which in turn meshes with the ratio gear 216.

The output shaft 206 has secured thereto an output gear 234 and a cluster gear, designated 236, and comprised of gears 238 and 240. Rotatably disposed on the output shaft 206 is a ratio gear 242 which is selectively connectible with the output shaft 206 by a synchronizer clutch 244.

To establish the first and lowest ratio, the synchronizer clutch 226 is manipulated to selectively connect ratio gear 222 to the countershaft 204. During first gear operation, the rotation of input shaft 202 is transmitted to output shaft 206 via transfer gears 210 and 220, countershaft 204, ratio gears 222, 214 and gear 240.

It should be appreciated that ratio gear 214 is an idler gear during operation of this drive ratio. To establish the second gear ratio in the transmission 200, the synchronizer clutch 226 is manipulated to connect ratio gear 224 to ratio gear 222. During second gear operation, the rotation of input shaft 202 is transmitted to the output shaft 206 via transfer gear 208, ratio gear 224, ratio gear 222, ratio gear 214 and gear 240. It will be appreciated that the ratio gear 214 also serves as an idler gear during second gear operation.

Third, fourth and fifth gear operations are accomplished through the selective engagement of synchronizer 218 with ratio gears 214 and 216 and synchronizer clutch 244 with ratio gear 242, respectively. These ratios and the gear meshes which accomplish them are straightforward such that a more detailed description of the drive path is not believed necessary.

The reverse drive ratio is established by manipulating synchronizer clutch 230 to connect ratio gear 228 with the countershaft 204. During reverse drive operation, the rotation of input shaft 202 to output shaft 206 is accomplished via transfer gear 210, transfer gear 220, ratio gear 228, reverse idler gear 232, ratio gear 216 and gear 238. It will be noted that ratio gear 216 is operative as an idler gear during reverse operation.

In each of the above described embodiments, it should be appreciated that in at least one forward gear ratio that a ratio gear rotatably disposed on the input shaft provides an idler gear action between gears on the countershaft and on the output shaft. It is the use of this idler gear operation which permits the transmission mechanism to be maintained at the same or shorter axial length while also permitting the addition of one more gear ratios in the transmission mchanism.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A plural step multiratio transmission comprising: an input shaft; an output shaft disposed parallel to and noncoaxial with said input shaft; a countershaft disposed parallel to and noncoaxial with both said input shaft and said output shaft; intermeshing head set gear means including gear means drivingly connected to said input shaft and countershaft respectively; output cluster gear means drivingly connected with said output shaft; three ratio gear means rotatably disposed on said input shaft and meshing with said output cluster gear means; three ratio gear means rotatably disposed on said countershaft and operatively connected through meshing relation with respective ones of said ratio gear means on said input shaft; and selectively engageable clutch means on said input shaft and said countershaft for selectively individually connecting said gear ratio means to the respective shafts for rotation therewith for providing a plurality of distinct gear ratios between said input shaft and said output shaft, said ratio gear means on said input shaft being idler gear means for the respective gear means on said countershaft.

2. A plural step multiratio transmission comprising: an input shaft; an output shaft disposed parallel to and noncoaxial with said input shaft; a countershaft disposed parallel to and noncoaxial with both said input shaft and said output shaft; transfer gear means including gear means operatively connected to said input shaft and countershaft respectively; at least one ratio gear means rotatably mounted on said input shaft; cluster gear means drivingly connected with one of said input shaft and said output shaft; ratio gear means rotatably disposed on the other of said input shaft and output shaft and meshing with said cluster gear means; ratio gear means rotatably disposed on said countershaft and operatively connected through meshing relation with respective ones of said gear means on said input shaft; and selectively engageable clutch means for selectively individually connecting said gear ratio means to the respective shafts for rotation therewith for providing a plurality of distinct gear ratios between said input shaft and said output shaft, one of said ratio gear means on said input shaft being idler gear means for one ratio gear means on said countershaft.

* * * * *